United States Patent
Phillips

(10) Patent No.: US 7,787,827 B2
(45) Date of Patent: Aug. 31, 2010

(54) PREAMBLE DETECTION

(75) Inventor: Desmond Keith Phillips, Cambridgeshire (GB)

(73) Assignee: Ember Corporation, Boston, MA (US)

( * ) Notice: Subject to any disclaimer, the term of this patent is extended or adjusted under 35 U.S.C. 154(b) by 882 days.

(21) Appl. No.: 11/303,751

(22) Filed: Dec. 14, 2005

(65) Prior Publication Data
US 2007/0136057 A1    Jun. 14, 2007

(51) Int. Cl.
*H04B 17/00* (2006.01)
*G10L 19/02* (2006.01)
*G10L 19/00* (2006.01)

(52) U.S. Cl. .................. 455/67.13; 704/229; 704/230

(58) Field of Classification Search .............. 455/67.16, 455/11.1, 18, 24, 504, 63.1, 63.13, 81, 88, 455/578, 108, 126, 67.13; 704/229, 230
See application file for complete search history.

(56) References Cited

U.S. PATENT DOCUMENTS

| 4,122,393 | A | 10/1978 | Gordy et al. | |
| 4,893,316 | A | 1/1990 | Jane et al. | |
| 6,016,113 | A | 1/2000 | Binder | |
| 6,697,633 | B1 * | 2/2004 | Dogan et al. | 455/509 |
| 2001/0050592 | A1 * | 12/2001 | Wright et al. | 330/2 |
| 2004/0213351 | A1 * | 10/2004 | Shattil | 375/260 |
| 2005/0111524 | A1 * | 5/2005 | Baker et al. | 375/147 |

OTHER PUBLICATIONS

Blinn, James F., "Quantization Error and Dithering," *IEEE Computer Graphics and Applications*, pp. 78-82, Jul. 1994.

* cited by examiner

*Primary Examiner*—Melody Mehrpour
(74) *Attorney, Agent, or Firm*—Nields, Lemack & Frame, LLC

(57) ABSTRACT

Detecting a signal included receiving a modulated waveform, and processing a first quantized signal generated from the waveform to produce a second quantized signal. The second quantized signal is a representation of the first quantized signal with lower resolution that the first quantized signal. The second quantized signal is correlated with a quantized reference signal.

32 Claims, 3 Drawing Sheets

PREAMBLE DETECTION

BACKGROUND

The invention relates to preamble detection.

The IEEE 802.15.4 standard and the ZigBee™ standard provide communication protocols for relaxed throughput, low power consumption wireless communication applications, for example, ad-hoc wireless networking applications. Different kinds of physical layer components can be used provide the functionality specified by these higher layer protocols. Various integrated circuit designs have been proposed to implement these physical layer components that include radio frequency (RF) components and other analog and digital circuitry. Different design decisions make trade-offs that affect characteristics such as power consumption, reliability, accuracy, and/or cost.

SUMMARY

In one aspect, in general, the invention features a method and corresponding apparatus for signal detection. The method includes receiving a modulated waveform, and processing a first quantized signal generated from the waveform to produce a second quantized signal. The second quantized signal is a representation of the first quantized signal with lower resolution that the first quantized signal. The method also includes correlating the second quantized signal with a quantized reference signal.

Aspects of the invention may include one or more of the following features.

The method further includes detecting a reference signal based on the correlating.

The method further includes quantizing the reference signal to generate the quantized reference signal.

The reference signal includes a preamble signal.

Processing the first quantized signal includes dithering the first quantized signal and quantizing the dithered signal.

Dithering the first quantized signal includes dithering the first quantized signal with pseudorandom noise.

Dithering the first quantized signal with pseudorandom noise includes adding a pseudorandom noise signal to the first quantized signal.

The second quantized signal has a substantially lower resolution than the first quantized signal.

Each of the first and second quantized signals includes a sequence of quantized values, and the number of bits used to represent the values of the second quantized signal is substantially lower than the number of bits used to represent the values of the first quantized signal.

The number of bits used to represent the values of the second quantized signal is less than half of the number of bits used to represent the values of the first quantized signal.

The number of bits used to represent the values of the second quantized signal is less than or equal to 3 bits.

The number of bits used to represent the values of the second quantized signal is less than or equal to 2 bits.

One bit is used to represent the values of the second quantized signal.

The second quantized signal has substantially the same resolution as the quantized reference signal.

The second quantized signal has the same resolution as the quantized reference signal.

Each of the second quantized signal and the quantized reference signal includes a sequence of quantized values, and the number of bits used to represent the values of the signals is less than or equal to 3 bits.

The number of bits used to represent the values of the signals is less than or equal to 2 bits.

One bit is used to represent the values of the signals.

The received modulated waveform represents a baseband waveform demodulated from a radio frequency waveform.

The baseband waveform represents a quadrature of a waveform demodulated from a radio frequency waveform.

The received modulated waveform represents chips of spreading sequences representing data symbols.

The chips are modulated onto the waveform according to a minimum shift keying modulation approach.

The method further includes generating the first quantized signal, including demodulating the received modulated waveform.

Generating the first quantized sequence includes generating a sequence of values associated with symbols of the received modulated waveform.

Generating the sequence of values includes demodulating the symbols.

Demodulating the symbols includes phase demodulating the symbols.

Demodulating the symbols includes filtering the waveform using a matched filter.

Generating the sequence of values includes calculating values characterizing phase shifts based on samples of the demodulated symbols.

The method further includes selecting the lengths of the second quantized signal and the quantized reference signal based on sensitivity of detecting a preamble signal.

The lengths correspond to a plurality of chips of spreading sequences representing a plurality of data symbols.

The lengths correspond to a plurality of chips of spreading sequences representing a single data symbol.

Aspects of the invention may include one or more of the following advantages.

A preamble detection process uses severe quantization to reduce the number of gates, size, and/or power consumption of an integrated circuit. The severe quantization reduces the number of bits used to represent a preamble signal, which reduces the power consumption of the preamble detection portion of the circuitry. The preamble detection process also uses dithering (e.g., randomizing by adding a random or pseudorandom signal) to remove DC bias associated with low input signal levels, randomize quantization errors, and increase sensitivity of preamble detection.

Other features and advantages of the invention will become apparent from the following description, and from the claims.

DESCRIPTION

1 Overview

Figure 1A:
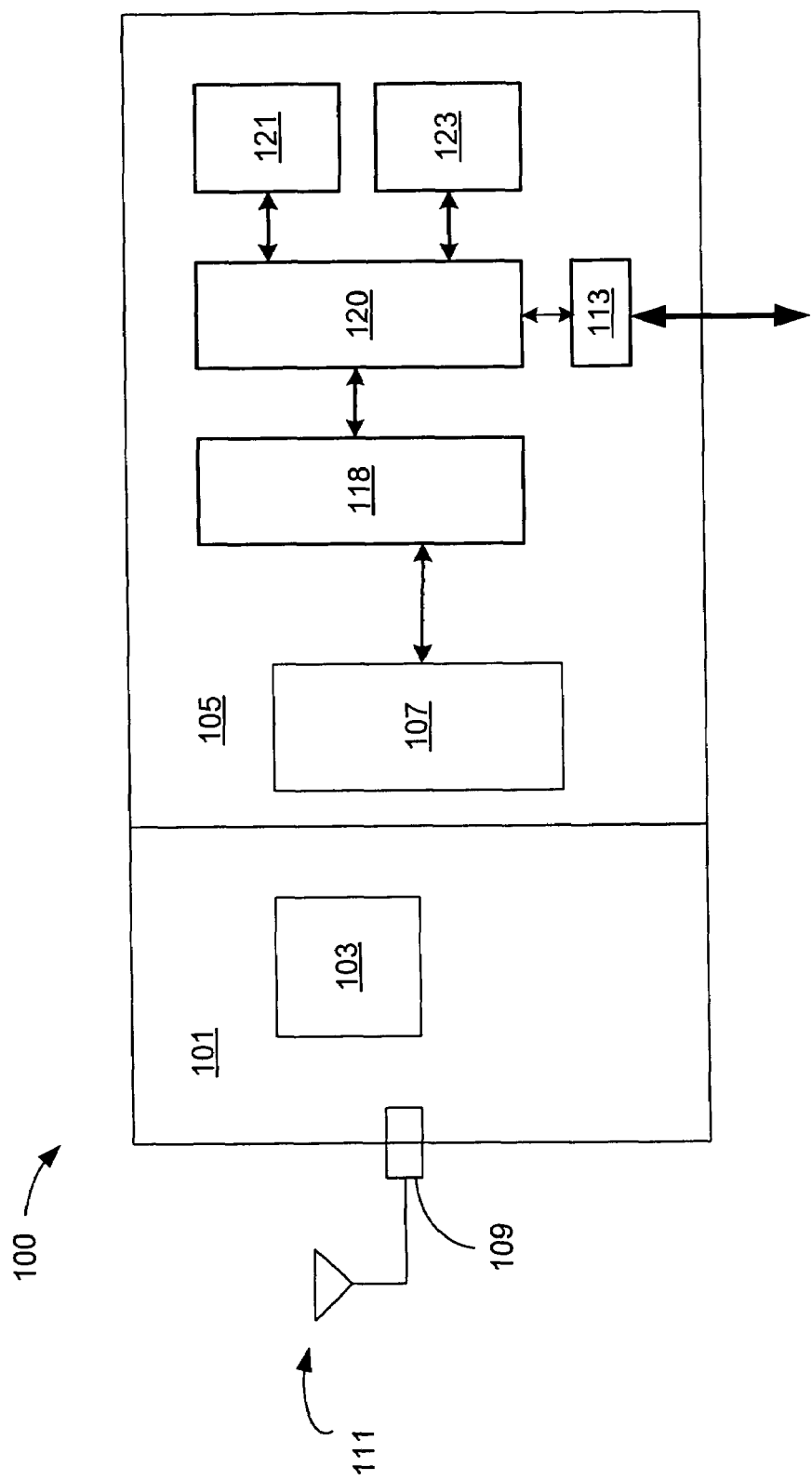
FIGS. 1A and 1B are block diagrams of an integrated circuit.

Referring to FIG. 1A, an integrated circuit (IC) 100 is configurable for use in a variety of wireless networking environments based on the IEEE 802.15.4 physical (PHY) and medium access control (MAC) layers including, e.g., the ZigBee™ networking environment and the EmberNet™ networking environment. The IC 100 can be used in both full functionality devices (FFD) and reduced functionality devices (RFD). The IC 100 uses a small number of external components to provide a radio transceiver that includes an on-chip microprocessor 120 for execution of protocol stack software and custom application software. The configurable nature of the IC 100 is not required in all embodiments of the approaches described below.

The IC 100 implements a radio transceiver containing analog circuitry 101 including a super heterodyne receiver 103, other frequency synthesis and timing circuitry, and digital circuitry 105 including baseband (BB) signal processing circuitry 107 and other data processing control circuitry. Various control signals and analog/digital conversion components provide an interface between the analog circuitry 101 and digital circuitry 105, as described in more detail below.

The analog circuitry 101 includes an interface 109 to an RF antenna 111 for reception and transmission of RF signals. The RF antenna 111 is provided, for example, as part of the device that incorporates the IC 100. For RF reception, the super heterodyne receiver demodulates a received RF signal for one of a set of channels with RF frequencies (e.g., near 2.4 GHz) to an intermediate frequency (IF) signal (e.g., 4 MHz). The analog circuitry converts this IF signal to a digital signal that is further demodulated to a BB signal by the digital circuitry 105. For RF transmission, the analog circuitry 101 modulates an RF signal at one of the channel frequencies using Minimum Shift Keying (MSK) modulation (also known as Offset Quadrature Phase Shift Keying (O-QPSK) with half-sine pulse shaping) with direct sequence spread spectrum (DSSS) modulated data provided by the digital circuitry 105. In other implementations, other forms of modulation can be used, with or without spread spectrum modulation.

The digital circuitry 105 includes a microprocessor 120 that includes a memory controller to access a flash memory module 121 (e.g., for storing executable software) and a RAM memory module 123 (e.g., for storing data). The microprocessor 120 includes a serial interface 113 that can be used to test and characterize various functions of the IC 100. Also, the serial interface 113 can be used to load executable software into the flash memory module 121 either directly, or optionally, by downloading a boot program into the RAM memory module 123 which the microprocessor 120 uses to first download software blocks into the RAM memory module 123 and then copy the blocks into the flash memory module 121.

The digital circuitry 105 also includes a lower MAC module 118 that interfaces with the microprocessor 120 sending and receiving packet data, and with the BB signal processing circuitry 107 sending and receiving packets with MAC layer information (called "frames"). The lower MAC module 118 handles various MAC layer functions including, for example, cyclic redundancy check (CRC) codes, packet acknowledgements, and backoff timing.

Figure 1B:
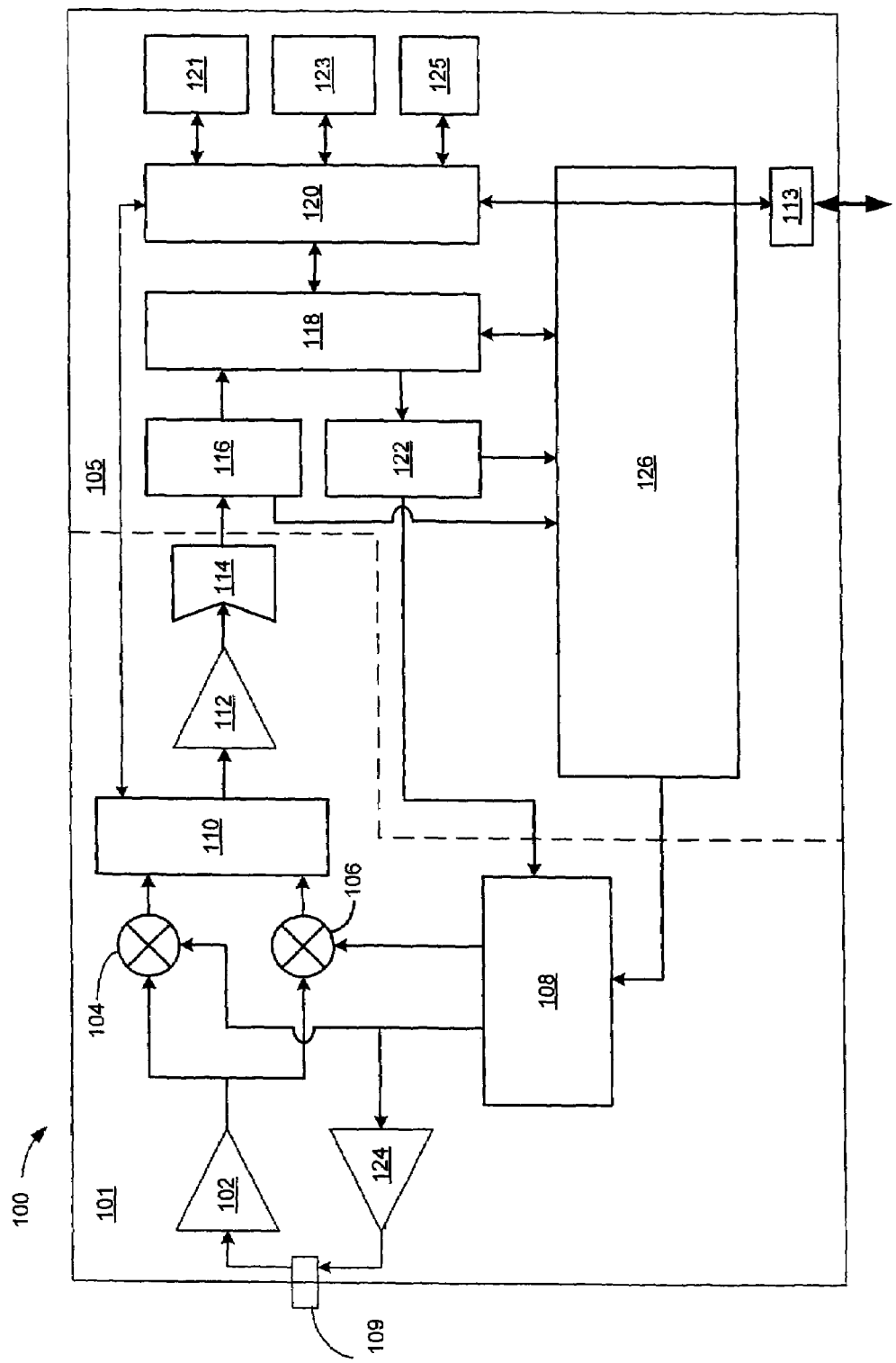

Referring to FIG. 1B, an exemplary implementation of the super heterodyne receiver 103 includes a low-noise amplifier (LNA) 102 that provides an amplified version of the RF signal received over the RF antenna interface 109. An in-phase (I) mixer 104 and a quadrature-phase (Q) mixer 106 mix the RF signal with a local oscillator (LO) signal provided by a frequency synthesizer 108 to provide I and Q signals to a polyphase band-pass filter 110. The frequency synthesizer 108 tunes the LO signal to the difference between a desired RF channel and the 4 MHz IF frequency. The polyphase band-pass filter 110 and an IF amplifier 112 provide an IF signal containing the information content of the desired RF channel. An analog-to-digital converter (ADC) 114 samples the IF signal faster than the 8 MHz Nyquist rate, e.g., at 12 MHz.

The BB signal processing circuitry 107 includes a BB receiver 116 and a BB transmitter 122. The digital signal processing performed by the BB receiver 116 and the BB transmitter 122 can be implemented in software, hardware, or a combination of software and hardware.

The BB receiver 116 performs coherent demodulation using an LO signal at the IF frequency from a phase-locked loop (PLL). The preamble of the demodulated signal is used to achieve frequency, phase and symbol timing lock with the received signal. The BB receiver 116 uses dithering and severe quantization to determine a phase error from a correlation signal for adjusting the PLL, as described in more detail below in section 2. The BB receiver 116 recovers the DSSS modulated data in the BB signal by sampling the bits or "chips" of a symbol's spreading sequence and despreading to recover the data bits.

The BB transmitter 122 directly modulates the output of the frequency synthesizer 108 with the information in a frame. The resulting frequency synthesizer signal is amplified by a power amplifier 124 and coupled over the interface 109 to the RF antenna 111. The BB transmitter 122 includes a spreader for processing the frame bits provided by the lower MAC module 118. The spreader converts a sequence of frame bits at a bit rate of $R_b$ (e.g., 250 kbps for ZigBee™) into a DSSS modulated sequence of chips at a chip rate of $R_b$ (e.g., 2 Mchips/sec for ZigBee™). This chip sequence is used to modulate the frequency synthesizer 2.4 GHz carrier wave.

An encryption module 125 is coupled to the microprocessor 120 via a register block interface. The encryption module 125 can implement, for example, the Advanced Encryption Standard (AES). The encryption module 125 provides hardware acceleration for encryption.

The IC 100 includes other analog and digital timing and control circuitry 126 that includes, for example, an interrupt controller, IC power management and internal oscillators.

2 Baseband Receiver 2.1 Signal Path

Figure 2:
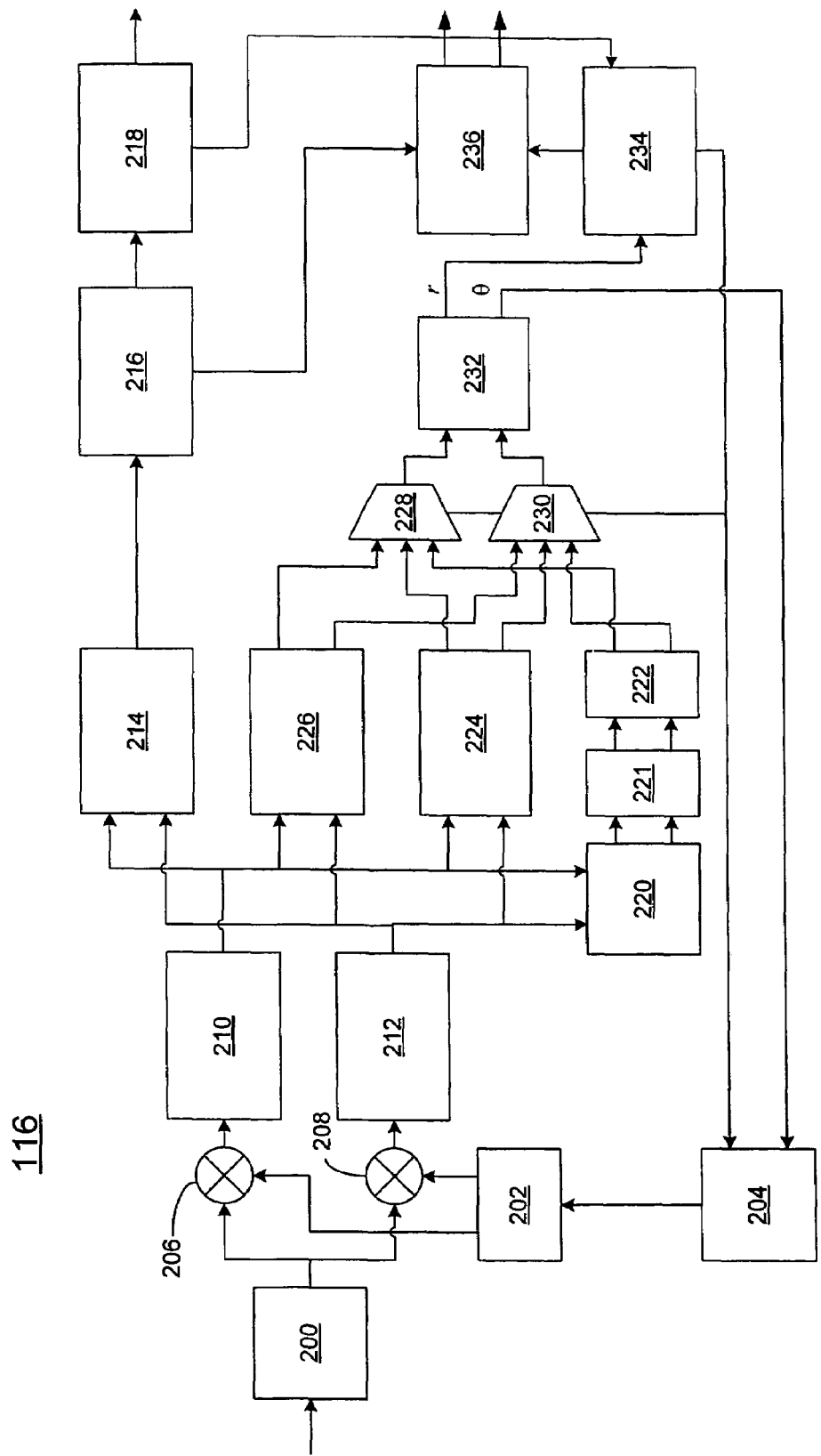
FIG. 2 is a block diagram of a receiver.

Referring to FIG. 2, BB receiver 116 includes a high-pass filter 200 that removes any low frequency content in the incoming IF signal including any DC offset. A digital phase-shifter 202 provides a first LO signal (initially at 4 MHz) from a phase-locked loop (PLL) 204 to an in-phase (I) mixer 206. The phase-shifter 202 provides a second 90 degree phase-shifted version of the first LO signal to a quadrature-phase (Q) mixer 208. The I mixer 206 provides a BB I signal to a matched filter 210, and the Q mixer 208 provides a BB Q signal to a matched filter 212. The matched filters 210, 212 are matched to a half-sine shape (e.g., sin(x) for x=0 to $\pi$) since the "chip symbols" in the MSK modulated signal have a half-sine shape.

A chip sampler 214 "samples" the resulting I and Q signals from the matched filters 210, 212. Since the ADC 114 runs at 12 MHz and the chip rate of the spreading sequence is 2 MHz, there are 6 samples for each chip. By "sampling" the samples of the filtered chips at the optimum chip sampling points as determined by the preamble detection process described below, the chip sampler can obtain a sequence of 32 (binary) chip values that make up a data symbol.

The chip sampler 214 provides this chip signal to a despreader 216. The despreader 216 matches the sequence of 32 chips that make up a symbol to one of 16 possible spreading sequences. Each spreading sequence corresponds to a symbol representing 4 bits of binary data. The resulting (4-bit) symbol rate is 62.5 kHz and the data rate is 250 kbits/s. A frame extracter 218 recovers the individual frames that are provided to the lower MAC module 118.

2.2 Preamble Detection

A preamble detection process uses a phase discriminator 220 and a correlator 222 to provide initial frequency and phase error that is used to adjust the PLL 204. After an initial frequency and phase correction, the preamble detection process uses a preamble phase detector 224 to make finer adjustments in the frequency and phase of the PLL 204. By the end of the preamble detection process, a frequency, phase and timing lock to the signal being received has been acquired. During lock, a non-preamble phase detector 226 enables fine adjustments to be made to the frequency and phase.

The phase discriminator 220 processes the in-phase signal I[n] and quadrature-phase signal Q[n] signal from the matched filters 210, 212 as a complex signal: x[n]=I[n]+iQ[n]. The phase discriminator 220 generates a signal y[n]=x[n] x[n −6] (where * represents complex conjugation). The phase of the signal y[n] provides information about how far the phase of the signal x[n] has shifted since the last chip symbol period, and therefore characterizes the phase shifts corresponding to the chip symbols. In this implementation using MSK modulation, the chip symbol represents two binary chip values according to the MSK constellation. In other implementations using other types of modulation, a demodulator recovers the chips (or bits) of a symbol in the corresponding constellation.

The output signal y[n] of the phase discriminator 220 is severely quantized to reduce the number of bits used to represent the signal, which reduces the power consumption of the preamble detection portion of the IC 100. Since the severe quantization introduces a quantization bias, the signal values are dithered to reduce impact of the quantization bias on preamble detection sensitivity (e.g., quantified by signal to noise ratio). For a 1 bit quantizer, there is a bias of ½ a bit on average (or maximum 1 bit), which for low input signals is significant. When the input signal is 0, a 1-bit quantizer, which takes the sign bit, gives an output of 1. The quantized values are represented by 1 bit (e.g., 0 representing −1 and 1 representing +1).

In this example, the signal y[n] is quantized to 1 bit and the correlator 222 correlates 1-bit input sequences. A dithering quantizer 221 takes 8-bit quantized I signal Re{y[n]} and Q signal Im{y[n]} and generates 1-bit quantized I signal Re{ŷ[n]} and Q signal Im{ŷ[n]}. The signals Re{ŷ[n]} and Im{ŷ[n]} are quantized to 1-bit (representing −1 and +1) after having been dithered by subtracting (or adding) a pseudorandom dither signal (e.g., generated in hardware by linear feedback shift registers, or in software by a pseudorandom number generator) from both the real and imaginary parts of y[n] and then taking just the most significant bit of the two's complement representation of each of the real and imaginary parts.

The 1-bit quantized values of the pseudorandom dither signal are represented by 1 bit (e.g., 0 representing −1 and 1 representing +1). However, more than 1 bit is stored when the values of the dither signal are subtracted from the real and imaginary parts of y[n] since the values are processed as sign extended two's complement binary numbers (e.g., −1 stored as 11111111).

The pseudorandom dither signal is selected so that it does not cause a false alarm peak output from the correlator 222 in the absence of any input signal x[n]. For example, if the input of the phase discriminator 220 is very low over an extended length of time, then if the values of Re{y[n]} and Im{y[n]} were not dithered, the 1-bit quantized input to the correlator 222 would be likely to include long sequences of zero values that would increase the probability of false-alarm peaks in the correlator output. By subtracting a pseudorandom 1-bit quantized value, the input to the correlator 222 would randomly vary between −1 and +1 supressing the correlator false-alarm peaks. When the input of the phase discriminator 220 is strong, the fluctuations due to dithering are swamped by the real correlator signal peak. Thus, when x[n] is zero, the statistics of ŷ[n] (over the short-term length of the correlator 222) are selected to be approximately zero-mean and white. This dithering removes DC bias associated with low input signal levels, randomizes quantization errors, and increases sensitivity of preamble detection (e.g., an increase in sensitivity of 1 dB).

The correlator 222 is implemented, for example, as a 384 sample long (two data symbols long) FIR filter (2 symbols× 32 chips/symbol×6 samples/chip=384 samples). Optionally, the length of the FIR filter can be selected (e.g., by software) to trade off power consumption and sensitivity. A shorter length filter consumes less power, at the expense of sensitivity of detecting the preamble. The correlator 222 takes as input 384 values of each of the 1-bit quantized I signal Re{ŷ[n]} and Q signal Im{ŷ[n]}. The correlator 222 correlates each of these input signals with a sequence that represents the expected ideal output of the phase discriminator 220 with quantization, but without dithering (complex conjugated and time-reversed).

This ideal quantized output sequence is generated, for example, based on a high-resolution waveform representing the output of the phase discriminator 220 in response to a known "theoretically ideal" preamble pattern. This high-resolution waveform is scaled by a factor α over a range of values of α. For each value of α, the scaled high-resolution waveform is quantized by choosing a sequence value closest to the actual waveform amplitude at each sample in the sequence from a set of desired quantization values q. The Mean-Square Error (MSE) in the resulting quantized scaled sequence relative to the unscaled high-resolution waveform is computed. The value of α that gives the minimum MSE is then used to provide the ideal quantized output sequence used by the correlator 222.

As described above, the set q is chosen to provide severe quantization to facilitate efficient hardware implementation. The signal y[n] is initially quantized since it is a digital signal represented by a finite set of binary numbers (e.g., 32-bit, 16-bit, or 8-bit floating point numbers). The number of bits used to represent the signal ŷ[n], however, is substantially lower than the number of bits used to represent the signal y[n]. For example, the set q can be {−1, +1}, using 1 bit to quantize the signal ŷ[n]. Alternatively, the set q can use 2, 3, or 4 bits and still provide some of the hardware efficiency benefits of severe quantization. In some implementations in which a value of zero is not coded, a sequence quantized according to the set {−1, 0, +1} can be represented by 1-bit values, or a sequence quantized according to the set {−2, −1, 0, +1, +2} can be represented by 2-bit values.

Multiplexers 228 and 230 select the I and Q outputs, respectively, of the correlator 222 and feed them into a Cartesian to Polar converter 232. This converter 232 computes the modulus r and angle θ (to 6-bits accuracy) of the polar representation of the I and Q values. A peak in the modulus r indicates when two consecutive symbols are aligned within the correlator 222. The modulus r is fed into a preamble state machine 234 that controls a symbol timer 236 that provides both a symbol clock and a chip clock.

The preamble state machine 234 also controls the multiplexers 228 and 230 and the tuning of the PLL 204, as described below. The frame extracter 218 provides the preamble state machine 234 a signal indicating the end of a frame.

During an initial "acquire" phase of the preamble detection process, the preamble state machine 234 detects a peak in the modulus r based on a threshold P according to the following boolean condition, where r[n] is the current modulus value:

$$(r[n-2] \leq r[n-1]) \cdot (r[n-1] > r[n]) \cdot (r[n-1] > P)$$

where · is a logical AND operation. When the peak is detected, the angle θ is proportional to the preamble frequency offset and is scaled and used to adjust the frequency and phase of the LO signal provided by the PLL 204.

During a subsequent "lock" phase of the preamble detection process, the multiplexers 228 and 230 switch to the output of the preamble phase detector 224. The preamble state machine 234 again detects a peak but this time with P replaced by the height of the last highest peak. This information is used to fine tune the chip clock phase optimally on the assumption that a larger peak has a higher signal-to-noise ratio and thus gives better temporal information. For each subsequent peak, corresponding to symbol alignment in the correlator 222, the PLL parameters are adjusted to converge to an optimal frequency and phase of the LO signal.

After a preamble is detected, the symbol clock is initialized and the BB receiver 116 goes into a "locked" state. Lock is typically attained by the 6$^{th}$ or 7$^{th}$ symbol of the 8-symbol long preamble. In this locked state, the multiplexers 228 and 230 switch to the output of the non-preamble phase detector 226 to maintain symbol timing based on the (unknown) data. For example, the timing is adjusted by feeding early, middle, and late chip errors from the despreader 216 to the symbol timer 236 and shifting the chip clock and/or symbol clock by a fraction of a clock period if the early or late dispreading has fewer errors.

It is to be understood that the foregoing description is intended to illustrate and not to limit the scope of the invention, which is defined by the scope of the appended claims. Other embodiments are within the scope of the following claims.

What is claimed is:

1. An apparatus, comprising: a radio receiver including circuitry to receive a modulated waveform; and a baseband receiver including circuitry to process a first quantized signal generated from the waveform to produce a second quantized signal, the second quantized signal being a representation of the first quantized signal with lower resolution than the first quantized signal; and to correlate the second quantized signal with a quantized reference signal.

2. The apparatus of claim 1, wherein said baseband receiver further includes circuitry to detect a reference signal based on the correlation of the second quantized signal with the quantized reference signal.

3. The apparatus of claim 2, wherein said baseband receiver further includes circuitry to quantize the reference signal to generate the quantized reference signal.

4. The apparatus of claim 2, wherein the reference signal comprises a preamble signal.

5. The apparatus of claim 1, wherein processing the first quantized signal comprises dithering the first quantized signal and quantizing the dithered signal.

6. The apparatus of claim 5, wherein dithering the first quantized signal comprises dithering the first quantized signal with pseudorandom noise.

7. The apparatus of claim 6, wherein dithering the first quantized signal with pseudorandom noise comprises adding a pseudorandom noise signal to the first quantized signal.

8. The apparatus of claim 1, wherein the second quantized signal has a substantially lower resolution than the first quantized signal.

9. The apparatus of claim 8, wherein each of the first and second quantized signals comprises a sequence of quantized values, and the number of bits used to represent the values of the second quantized signal is substantially lower than the number of bits used to represent the values of the first quantized signal.

10. The apparatus of claim 9, wherein the number of bits used to represent the values of the second quantized signal is less than half of the number of bits used to represent the values of the first quantized signal.

11. The apparatus of claim 10, wherein the number of bits used to represent the values of the second quantized signal is less than or equal to 3 bits.

12. The method of claim 11, wherein the number of bits used to represent the values of the second quantized signal is less than or equal to 2 bits.

13. The apparatus of claim 12, wherein 1 bit is used to represent the values of the second quantized signal.

14. The apparatus of claim 1, wherein the second quantized signal has substantially the same resolution as the quantized reference signal.

15. The apparatus of claim 14, wherein the second quantized signal has the same resolution as the quantized reference signal.

16. The apparatus of claim 1, wherein each of the second quantized signal and the quantized reference signal comprises a sequence of quantized values, and the number of bits used to represent the values of the signals is less than or equal to 3 bits.

17. The apparatus of claim 16, wherein the number of bits used to represent the values of the signals is less than or equal to 2 bits.

18. The apparatus of claim 17, wherein 1 bit is used to represent the values of the signals.

19. The apparatus of claim 1, wherein the received modulated waveform represents a baseband waveform demodulated from a radio frequency waveform.

20. The apparatus of claim 19, wherein the baseband waveform represents a quadrature of a waveform demodulated from a radio frequency waveform.

21. The apparatus of claim 1, wherein the received modulated waveform represents chips of spreading sequences representing data symbols.

22. The apparatus of claim 21, wherein the chips are modulated onto the waveform according to a minimum shift keying modulation approach.

23. The apparatus of claim 1, wherein said baseband receiver further includes circuitry to generate the first quantized signal, including demodulating the received modulated waveform.

24. The apparatus of claim 23, wherein generating the first quantized sequence comprises generating a sequence of values associated with symbols of the received modulated waveform.

25. The apparatus of claim 24, wherein generating the sequence of values comprises demodulating the symbols.

26. The apparatus of claim 25, wherein demodulating the symbols comprises phase demodulating the symbols.

27. The apparatus of claim 25, wherein demodulating the symbols comprises filtering the waveform using a matched filter.

28. The apparatus of claim 27, wherein generating the sequence of values comprises calculating values characterizing phase shifts based on samples of the demodulated symbols.

29. The apparatus of claim 1, wherein the lengths of the second quantized signal and the quantized reference signal are selected based on sensitivity of detecting a preamble signal.

30. The apparatus of claim 29, wherein the lengths correspond to a plurality of chips of spreading sequences representing a plurality of data symbols.

31. The apparatus of claim 29, wherein the lengths correspond to a plurality of chips of spreading sequences representing a single data symbol.

32. A method for signal detection, comprising: receiving a modulated waveform with a radio receiver; processing a first quantized signal generated from the waveform with a baseband receiver to produce a second quantized signal, the second quantized signal being a representation of the first quantized signal with lower resolution than the first quantized signal; and correlating the second quantized signal with a quantized reference signal.

* * * * *